United States Patent
Sinclair et al.

(10) Patent No.: US 7,244,492 B2
(45) Date of Patent: Jul. 17, 2007

(54) SOLUBLE FIBERS FOR USE IN RESIN COATED PROPPANT

(75) Inventors: A. Richard Sinclair, Houston, TX (US); Syed Akbar, Pearland, TX (US); Patrick R. Okell, Bellaire, TX (US)

(73) Assignee: Fairmount Minerals, Ltd., Chardon, OH (US)

( * ) Notice: Subject to any disclaimer, the term of this patent is extended or adjusted under 35 U.S.C. 154(b) by 230 days.

(21) Appl. No.: 10/793,429

(22) Filed: Mar. 4, 2004

(65) Prior Publication Data

US 2005/0194141 A1    Sep. 8, 2005

(51) Int. Cl.
*B32B 5/16* (2006.01)

(52) U.S. Cl. ............... 428/325; 428/326; 428/327; 428/403; 428/404; 428/406; 428/407; 524/492; 524/493; 524/494; 524/495; 524/496; 523/130; 523/131; 523/132

(58) Field of Classification Search ........... 428/325, 428/326, 327, 403, 404, 406, 407; 524/492, 524/493, 494, 495, 496; 523/130, 131, 132
See application file for complete search history.

(56) References Cited

U.S. PATENT DOCUMENTS

| 3,659,651 A | 5/1972 | Graham ............... 166/280 |
| 3,929,191 A | 12/1975 | Graham et al. ....... 166/276 |
| 5,218,038 A | 6/1993 | Johnson et al. ...... 524/541 |
| 5,422,183 A | 6/1995 | Sinclair et al. ...... 428/403 |
| 5,597,784 A | 1/1997 | Sinclair et al. ...... 507/219 |
| 5,837,656 A | 11/1998 | Sinclair et al. ...... 507/220 |
| 6,380,138 B1 | 4/2002 | Ischy et al. .......... 507/204 |
| 6,528,157 B1 * | 3/2003 | Hussain et al. ...... 428/325 |
| 6,632,527 B1 | 10/2003 | McDaniel et al. .... 428/402 |

* cited by examiner

*Primary Examiner*—Leszek Kiliman
(74) *Attorney, Agent, or Firm*—Calfee, Halter & Griswold, LLP

(57) ABSTRACT

Coated particle substrates having a coating of resin and/or water soluble polymers and soluble, fibrous material are provided for use in subterranean formations. The coated particle substrate particles are typically proppants used to prop open subterranean hydrocarbon formations during recovery processes, such as after a hydraulic fracture, and provide both improved settling characteristics and improved hydrocarbon flow characteristics due to the conductive channels formed by the soluble fibers downhole. Methods of making the coated particles are also described.

21 Claims, 2 Drawing Sheets

SOLUBLE FIBERS FOR USE IN RESIN COATED PROPPANT

FIELD OF THE INVENTION

The invention relates to particulate substrates coated with polymers or resin and, more specifically, to polymeric or resin coated particulate substrates having soluble fibers embedded into the resin coat covering the particle surface. In particular, a proppant particle having acyclical soluble fibers or soluble particles embedded in at least one resin coat covering the particulate substrate is disclosed. The present invention also relates to methods of making and/or using the particulate substrates having soluble fibers embedded in the polymeric or resin coating surrounding the particulate substrate core.

DESCRIPTION OF RELATED ART

Particulate substrates, known generally as proppants, are used extensively in hydraulic fracturing operations on subterranean formations (e.g., oil or gas bearing strata) to keep the fracture open so as to allow for improved fluid recovery. Most commonly, the fracturing operations are performed in subterranean formations in order to increase oil or gas production, although there are several instances of fracturing being used in other, similar subterranean recovery operations. Generally, fracturing is caused by injecting a viscous fracturing fluid or fluid mixture into the subterranean formation through a wellbore at extremely high pressures. As the fracture is formed, a particulate material, referred to as a "proppant" or "propping agent", is introduced into the formation so as to maintain the fracture in a propped open condition when the fracture is ended and the injection pressure is released. As the fracture forms, the proppants are carried out into the fracture zone by suspending them in the fracturing fluid itself. Upon release of the pressure, the proppants settle and form a "pack" which serves to hold the subterranean formation open. As such, the production of oil and/or gas is ideally increased by now having a series of conductive channels flowing through the formation. As is readily apparent from this process, the choice of proppant not only depends upon the formation conditions, but on the ultimate success of the well stimulation itself.

While the proppant in the fracture provides a series of conductive channels in the subterranean formation, the actual degree of stimulation afforded by the fracture treatment is greatly dependent upon formation parameters, fracture permeability, and the fracture's propped width. Therefore, the proppant itself must necessarily have characteristics which will allow it to reduce crushing from the high stresses in the well, as well as enhance or encourage fluid flow through the formation. Consequently, numerous modifications to the basic proppant particulate substrate, e.g. sand, have been made over the years.

One of the more extensively explored modifications of proppant particles are resin coatings. The use of resin coated particles (or resin coated proppants) has been known for numerous years, as disclosed, for example, in U.S. Pat. Nos. 3,659,651 to Graham; 3,929,191 to Graham, et al.; 5,218,038 to Johnson, et al.; 5,422,183 to Sinclair, et al.; and 5,597,784 to Sinclair, et al. Known resins used in resin coated proppants include epoxy, furan, phenolic resins, and combinations of such resins, and are classified as being either precured or curable.

Significant advances in the area of resins and the resin coating of proppants have also been advanced by Fairmount Minerals Ltd. in U.S. Pat. No. 6,380,138 to Ischy, et al., and by Santrol, Inc. in U.S. Pat. No. 5,837,656 to Sinclair, et al. The latter of these two patents, U.S. Pat. No. 5,837,656, describes an improved resin coated particle comprising a particulate substrate, an inner coating of a curable resin and an outer coating of a substantially cured resin. These improved resin coated particles are produced by first coating the substrate with a reactive resin. A second or outer coating of a resin is then coated over the inner curable resin coating and subjected to conditions of time and temperature sufficient to substantially cure said outer coating while the inner coating remains curable. The particles are described as capable of being used in methods for treating subterranean formations comprising placing in or adjacent to the formation a quantity of the resin coated particles and allowing them to cure into a high strength permeable mass in the formation.

Recent modifications to resin-coated proppants have included the use of filler or fibrous materials in the particulate substrate itself, or in the resin coating surrounding the particulate core. For example, U.S. Pat. No. 6,632,527 to McDaniel, et al. describes composite particles made of a binder and filler material that are useful in subterranean formation operations, particularly in propping open subterranean formation fractures. Similarly, U.S. Pat. No. 6,528,157 to Hussain, et al. describes coated particles made of particulate substrates having a coating of resin and fibrous material, useful for propping open subterranean formation fractures. As described therein, the fibers used are "inert to components in the subterranean formation, e.g., well treatment fluids, and be able to withstand the conditions, e.g., temperature and pressure, in the well" (column 6). Consequently, the proppants with the insoluble fiber resin coatings of the '157 patent are useful as proppants and for improved flowback control. The roughness of the insoluble fibers described in the '157 patent can be problematic, in that they can induce turbulent flow, an undesirable feature in a proppant. However, many of these modified propping agents fail to fully address issues of proppant settling during introduction into the fracture, and issues of improved fluid flow.

Thus, there exists a need for a modified particulate substrate with improved strength characteristics, settling properties, and improved conductivity features, for use in subterranean recovery operations. More specifically, by virtue of the incorporation of soluble fibers or fibrous material onto the particulate substrate, the problematic issues of roughness can be avoided.

SUMMARY OF THE INVENTION

It is an object of the present invention to provide particulate substrate materials having soluble fibrous material partially or fully embedded in a resin or polymer coating surrounding the particulate substrate. Such coatings can include phenol-aldehyde novolac polymers and phenol-aldehyde resole polymers, as well as water-soluble polymeric outer coatings. The soluble fibrous material desirably is selected from materials composed of polyethylene oxides, polypropylene oxides, polymeric lactones, water-soluble acrylic fibers, latex fibers, polyester fibers, polyactide fibers, collagen fibers, natural fibers, synthetic fibers, and mixtures thereof.

In yet a further embodiment of the present invention, a particulate substrate having soluble fibrous material partially or fully embedded in a resin or polymer coating, as well as a final, outer coating of rapidly soluble resin or polymer(s) that completely or partially enclose the underlying soluble fibers is envisaged.

It an additional object of the present disclosure to provide methods of making particulate substrate materials coated with resins or polymers having soluble fibrous material embedded or contained therein.

It is a further object of the present disclosure to provide methods of using particulate substrate materials coated with a soluble fiber and/or soluble particle containing polymer or resin.

DESCRIPTION OF THE FIGURES

The following figures form part of the present specification and are included to further demonstrate certain aspects of the present invention. The invention may be better understood by reference to one or more of these figures in combination with the detailed description of specific embodiments presented herein.

DEFINITIONS

Figure 1:
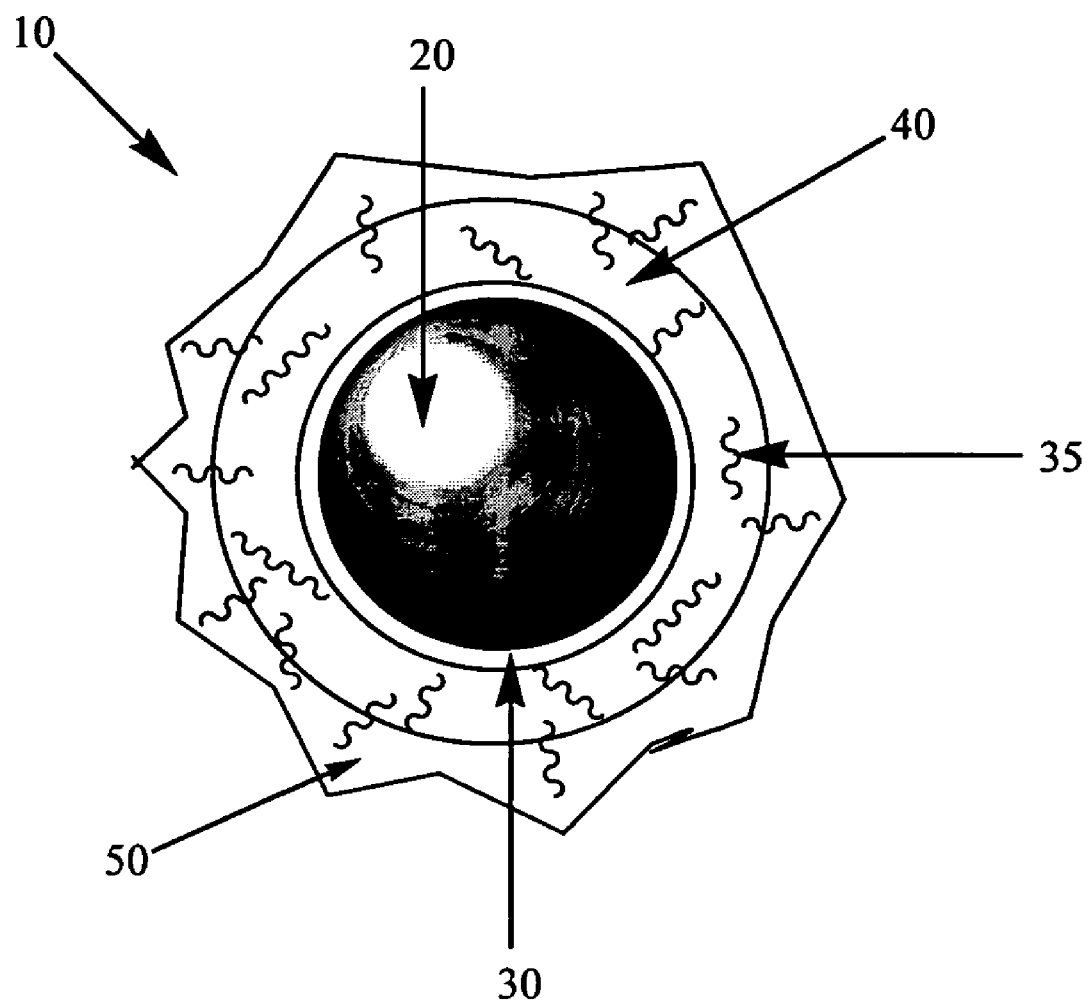
FIG. 1 shows a schematic drawing of one embodiment of the present invention for use as a proppant.

The use of the terms "fluid", "fracturing fluid", and "well treatment fluid", as used herein, are meant to be terms related to fluids used in subterranean operations. For example, the term "fluid", as used herein, can be meant to be any fluid which can be used in a subterranean treatment, including but not limited to fracturing and gravel packing, while the term "fracturing fluid", as used herein, can be meant to refer to those fluids presently used in the field of fracturing and hydraulic fracturing and which serve to aid in the displacement of subterranean formations by high-pressure injection into the formation. The term "well treatment fluid", as used herein, can be meant to mean any number of known water-based, oil-based, emulsion-based, or other similar fluids that can be used to "treat" a subterranean formation in order to overcome a hydrocarbon production problem and increase productivity from the formation, as well as any of the alternative meanings described above.

In embodiments described and disclosed herein, the use of the term "introducing" includes pumping, injecting, pouring, releasing, displacing, spotting, circulating, or otherwise placing a fluid or material within a well, wellbore, or subterranean formation using any suitable manner known in the art. Similarly, as used herein, the terms "combining", "contacting", and "applying" include any known suitable methods for admixing, exposing, or otherwise causing two or more materials, compounds, or components to come together in a manner sufficient to cause at least partial reaction or other interaction to occur between the materials, compounds, or components.

The use of the term "soluble", as used within the present disclosure, refers to objects, particularly fibers, resins, or coatings, which are capable of dissolution under certain predefined condition. Such conditions include, but are not limited to, pH, temperature, pressure, chemicals such as those contained in fracturing fluids, and combinations thereof. Preferably, the term "soluble" as used herein refers to resins, polymers, coatings, and fibers which are stable (do not dissolve) under ambient, surface conditions, but which become soluble after a given time when placed in a subterranean environment.

The term "proppant", as used herein, refers to those sized particles that are used in well workovers and treatments, such as hydraulic fracturing operations, to hold fractures open following the treatment. Such sized particles are often mixed with fracturing fluid(s) to hold fractures open after a hydraulic fracturing treatment or similar downhole well treatment. In addition to naturally occurring sand grains, the term "proppant" includes man-made or specially engineered proppants, such as resin-coated sand or high-strength ceramic materials like sintered bauxite. Typically, but not necessarily, proppant materials are carefully sorted for size and sphericity to provide an efficient conduit for production of fluid from the reservoir to the wellbore.

In embodiments described and disclosed herein, the term "hydraulically induced fracture" refers to the stimulation treatment routinely performed on oil and gas wells in low-permeability reservoirs. In such a treatment, specially engineered fluids are pumped at high pressure and rate into the reservoir interval to be treated, causing a vertical fracture to open. The wings of the fracture extend away from the wellbore in opposing directions according to the natural stresses within the formation. Proppant, such as grains of sand of a particular size, and more particularly the proppant of the present invention having soluble fibers embedded in at least one of the resin or polymer coats, can be mixed with the treatment fluid keep the fracture open when the treatment is complete. Hydraulic fracturing creates high-conductivity communications with a large area of formation and bypasses any damage that may exist in the near-wellbore area. Hydraulically induced fractures can significantly enhance the permeability of rocks by connecting pores together, and for that reason, fractures are induced mechanically in some reservoirs in order to boost hydrocarbon flow. The process of pumping into a closed wellbore with powerful hydraulic pumps creates enough downhole pressure to crack or fracture the formation. This allows injection of proppant into the formation, thereby creating a plane of high-permeability particles through which fluids can flow. The proppant ideally remains in place once the hydraulic pressure is removed and therefore props open the fracture and enhances flow into the wellbore.

DETAILED DESCRIPTION OF THE INVENTION

Described herein are proppant particles having a particulate substrate with an outer surface, wherein the outer surface is covered with at least one coating of resin or polymeric material. The coating contains soluble, fibrous material embedded in the coating on the outer surface of the particulate substrate, and can optionally include an outer coating of rapidly soluble resin or polymer which substantially encapsulates the underlying soluble fibers.

Also described herein are methods of preparing a proppant particle, wherein a particulate substrate material is contacted with a resin or polymer so as to coat the particulate substrate, and a soluble fibrous material is combined with the resin or polymer coating so that the soluble fibrous material is embedded (wholly or partially) in the resin or polymer coating. Optionally, and as a separate step, a final, rapidly soluble resin coat can be applied which substantially encapsulates the underlying soluble fibers and resin/polymer coats.

A. Substrate

Particulate material, also referred to herein as substrate material, suitable for use with the present invention includes a variety of particulate materials known to be suitable or potentially suitable propping agents which can be employed in downhole operations. In accordance with the present invention, the particulate material (or substrate material) which can be used include any propping agent suitable for hydraulic fracturing known in the art. Examples of such particulate materials include, but are not limited to, natural materials, silica proppants, ceramic proppants, metallic proppants, synthetic organic proppants, mixtures thereof, and the like.

Natural products suitable for use as proppants include, but are not limited to, nut shells such as walnut, brazil nut, and macadamia nut, as well as fruit pits such as peach pits, apricot pits, olive pits, and any resin impregnated or resin coated version of these. Typical resin coatings or impregnations include bisphenols, bisphenol homopolymers, blends of bisphenol homopolymers with phenol-aldehyde polymer, bisphenol-aldehyde resins and/or polymers, phenol-aldehyde polymers and homopolymers, modified and unmodified resoles, phenolic materials including arylphenols, alkylphenols, alkoxyphenols, and aryloxyphenols, resorcinol resins, epoxy resins, novolak polymer resins, novolak bisphenol-aldehyde polymers, and waxes, as well as the precured or curable versions of such resin coatings.

Silica proppants suitable for use with the present invention include, but are not limited to, glass spheres and glass microspheres, glass beads, silica quartz sand, sintered Bauxite, and sands of all types such as white or brown. Typical silica sands suitable for use include Northern White Sands (Fairmount Minerals, Chardon, Ohio), Ottawa, Jordan, Brady, Hickory, Arizona, and Chalford, as well as any resin coated version of these sands. In the case of silica fibers being used, the fibers can be straight, curved, crimped, or spiral shaped, and can be of any grade, such as E-grade, S-grade, and AR-grade. Preferably, the silica proppants used are silica sands.

Ceramic proppants suitable for use with the methods of the present invention include, but are not limited to, ceramic beads; spent fluid-cracking catalysts (FCC) such as those described in U.S. Pat. No. 6,372,378, which is incorporated herein in its entirety; ultra lightweight porous ceramics; economy lightweight ceramics such as "Econoprop" (Carbo Ceramics, Inc., Irving, Tex.); lightweight ceramics such as "Carbolite"; intermediate strength ceramics such as "Carboprop" or "Interprop" (all available from Carbo Ceramics, Inc., Irving, Tex.); and high strength ceramics such as "CarboHSP", "Sintered Bauxite" (Carbo Ceramics, Inc., Irving, Tex.), as well as any resin coated or resin impregnated versions of these, such as described above.

Metallic proppants suitable for use with the embodiments of the present invention include, but are not limited to, aluminum shot, aluminum pellets, aluminum needles, aluminum wire, iron shot, steel shot, and the like, as well as any resin coated versions of these metallic proppants.

Synthetic proppants are also suitable for use with the present invention. Examples of suitable synthetic proppants include, but are not limited to, plastic particles or beads, nylon beads, nylon pellets, SDVB (styrene divinyl benzene) beads, carbon fibers such as Panex carbon fibers from Zoltek Corporation (Van Nuys; Calif.), and resin agglomerate particles similar to "FlexSand MS" (BJ Services Company, Houston, Tex.), as well as resin coated versions thereof.

Additionally, soluble materials suitable for use as proppants are also envisioned to be useful with the methods of the present invention. For example, soluble proppants which are placed in the channels of the created perforations include, but are not limited to, marble or limestone chips or any other suitable carbonate particulates. Additionally, wax, plastic, or resin particles, either coated or uncoated, which are either soluble through contact with a treatment chemical or can melt and flowback from the fracture are suitable for use as;proppants with the present invention.

Suitable with the present invention, propping agents are typically used in concentrations from about 1 to about 18 pounds per gallon (about 120 g/L to about 2,160 g/L) of fracturing fluid composition, but higher or lower concentrations may also be used as required.

Similarly, the particulate substrate suitable for use with the present invention has a particle size in the range of USA Standard Testing screen numbers from about 4 to about 200 (i.e., screen openings of about 0.18 inch to about 0.003 inch). More particularly, particulate substrate sizes suitable for use with the present invention include size ranges from about 4 mesh (4750 microns) to about 200 mesh (75 microns). Also suitable for use with the present invention are particulate materials or proppants having size designations of 6/12, 8/16, 12/18, 12/20, 16/20, 16/30, 20/40, 30/50, 40/70 and 70/140, although any desired size distribution can be used, such as 10/40, 14/20, 14/30, 14/40, 18/40, and the like, as well as any combination thereof (e.g., a mixture of 10/40 and 14/40). The preferred mesh size, in accordance with the present invention, is 20/40 mesh.

B. Soluble Fibers

The soluble fibers, or soluble fibrous materials, suitable for use with the present invention can be of any number of types of commercially available soluble fibers. Such fibers include but are not limited to: polyethylene oxides, polypropylene oxides, polycaprolactones; grafts of polyethylene/polypropylene and polycaprolenes; grafts of polyethylene/polypropylene oxides and polycaprolactones; water soluble or water reducible acrylics; water reducible phenoxy resin; latex; polyesters; soluble block copolymers; grafts of polyvinyl alcohol (PVA) and polyvinyl acetates; polyactides and derivatives of polyactic acid; polyglycolic acid (PGA); polyglycoliclactic acid (PGLA); collagen, especially fiberized collagen; proteins with very low molecular weights, such as tropocollagen (the molecular unit of collagen fibrils that consist of repeating three-stranded polypeptide units arranged head to tail in parallel bundles, is a right-handed triple helix composed of 2 polypeptide chains, and is rich in glycine, proline, hydroxyproline, and hydroxylysine); water-soluble polymer fibers; oil-soluble polymer fibers; acid-soluble polymer fibers; natural polymers, such as wheat-based polymers; organic fibers; natural fibers, such as wheat, rice, soy, and corn fibers; fibrous minerals, such as wollastinite; soluble ceramic fibers; salt-crystal fibers (e.g., those that would be isotonic in brine solution); calcium carbonate fibers; inorganic salts coated and bonded with water soluble fibers; and mixtures thereof. Preferably, the soluble fiber/fibrous material is Polyox or WSR80 (Dow Chemical, Freeport, Tex.).

Also envisioned to be suitable for incorporation with the present invention are mixtures of soluble fibers as listed above, as well as insoluble fibers. For example, the resin or polymer coating on the outer edge of the particulate substrate, or any of the other polymer or resin coating layers surrounding the particulate substrate, could contain a mixture of glass fibers and polyethylene oxide fibers in any suitable proportion. Such insoluble fibers suitable for use with the present invention include those selected from the group consisting of glass fibers, milled glass fibers, carbon fibers, milled carbon fibers, ceramic fibers such as alumina, porcelain, and other vitreous materials, and synthetic fibers that are substantially insoluble. By insoluble, it is meant that the fibers are inert to subterranean conditions (temperature, pressure, pH, etc.), and do not dissolve. It is believed that the use of a mixture of soluble and insoluble fibers or fibrous materials in one or more of the resin layers would produce a product having the benefits of increasing proppant drag while decreasing particulate backflow into the wellbore or above ground equipment, while simultaneously obtaining increased conductivity due to the conductivity microchannels formed by the soluble fibers upon dissolution.

Soluble fibers or soluble fibrous materials used in accordance with the present invention should be soluble (that is, capable of dissolving in) in brines, water, oil, organic solvents, acid or acidic media, and/or in fluids having a pH in the range from about 1 to about 14, as well as mixtures thereof.

Resin-coated particulate substrates, such as proppants, in accordance with the present invention, preferably contain about 3% to about 25% soluble fibers based on the resin weight, preferably about 5 wt. % to about 15 wt. % soluble fibers, and more preferably about 8 wt. % to about 12 wt. % soluble fibers based on resin weight.

Soluble fibers or soluble fibrous materials used in accordance with the present invention preferably have acyclic shapes. Such shapes include but are not limited to granular, conical shapes, cylindrical shapes, helixes, dumb-bell shapes, and the like. The soluble fibers can also have granular, round, oval, square, rectangular, triangular, or other appropriately shaped cross-sections. The soluble fibers or fibrous materials suitable for use with the present invention have a length-to-diameter ratio of from about 1:1 to about 10:1, including about 2:1, about 3:1, about 4:1, about 5:1, about 6:1, about 7:1, about 8:1, about 9:1, and about 10:1. Preferably, the length of the soluble fiber has a length-to-diameter ratio (or, length to aspect ratio) of about 8:1. More preferably, the length of the soluble fiber is more than 2 times its diameter, giving it a length-to-diameter ratio (or, length to aspect ratio) of about 2:1. Soluble fiber diameters range from about 1 micron to about 30 microns, depending upon the type of soluble fiber. Preferred soluble fiber lengths range from about 5 microns to about 3200 microns (approximately ⅛ inch). More preferred soluble fiber lengths are from about 20 microns to about 400 microns. A typical soluble fiber length is about 10 microns to about 100 microns (e.g., about 20μ to about 40μ). Preferably, and in conjunction with the present invention, the soluble fibers are shorter than the greatest length (or diameter) of the particulate substrate. Suitable, commercially available soluble fibers include Polyox (Dow Chemical, Freeport, Tex.), having lengths of about 30 microns and a length-to-diameter ratio of about 8:1. As used herein, a soluble fiber is defined as a soluble particle having a length-to-diameter ratio of more than about 2. Fibers ground to a fine particulate with a particle size of 5 microns or less may also be employed along with other soluble fibers.

By employing soluble fibers or soluble fibrous materials, and entraining these soluble fibers between the outer edge of the particulate substrate core and the outer, resinous or polymeric layer, the present invention achieves curable proppants with high compressive strength and the ability to mechanically lock the particles together during the fracturing process. This so-called "mechanical locking" or interlocking is believed to be by a combination of factors, including but not limited to chemical interaction/reaction, and/or glutinous adhesion. These stronger, soluble-fiber containing proppants can also slow the settling rates of the proppant in the fracturing fluid itself during and after the fracture. This could help to reduce proppant settling-out during the pumping phase of the fracture treatment, as a result of fiber-interactions between proppant/particle grains and proppant interaction with the wall of the formation.

C. Resin or Polymer Coatings

The coating or coatings of the particulate substrate, in accordance with the present invention, can be a resin coating, or a polymeric coating. The only requirement is that the coating be capable of holding the soluble fibers in place. The resin or polymeric coatings may be cured or curable, and can also be soluble, such as water soluble polymers. In one embodiment, a final, optional outer coating can be applied to the particulate substrate, wherein the final outer coating is a soluble polymer coating (e.g., water-soluble coating) which protects the protruding soluble fibers from handling and associated pumping stressed before being delivered downhole.

In a preferred embodiment, the particulate substrate pellets are covered with an inner coating of a fusible, curable resin. Soluble fibers or fibrous materials are then added, after which an outer coating of a substantially cured resin is added. The resin coated particle can be used as a self-consolidating proppant, and is compatible with the fracturing fluid. If desired, the pellet may further comprise an additional coating of a substantially cured resin which is located on the exterior of the substrate and inside the inner coating. Optionally, the pellet can further comprise a further coating of a soluble polymer or polymers, so as to protect the proppant during transport and delivery to the subterranean formation, but which rapidly dissolves once the proppant is downhole. Such particles exhibit enhanced properties such as improved flowback control due to mechanical locking of the particles and slowing of proppant settling rate in the fracturing fluids. Further enhanced properties include improved hydrocarbon flow rates as a result of microchannels formed as the soluble fibers dissolve under formation conditions.

Resins suitable for the inner and outer coatings are generally any resins capable of being coated on the substrate and then being cured to a higher degree of polymerization. Examples of such resins include phenol-aldehyde resins of both the resole and novolac type, urea-aldehyde resins, melamine-aldehyde resins, epoxy resins and furfuryl alcohol resins and copolymers of such resins. The resins must form a solid non-tacky coating at ambient temperatures. This is required so that the coated particles remain free flowing and so that they do not agglomerate under normal storage conditions.

One additional and optional embodiment of the present invention is the addition of a final, outer soluble coating of rapidly soluble resin or polymer(s) which expose the soluble fibers during the short transit time between the blender and the placement of the product in the hydrocarbon producing formation at the beginning of the fracturing treatment. Such soluble resins and polymers are known in the art, and include but are not limited to water soluble resins, water soluble polymers, acid soluble resin, acid soluble polymers, and base soluble resins and polymers. Preferred for use with the present invention are water soluble resins and/or water soluble polymers, as well as mixtures thereof.

The preferred resins are the phenol-formaldehyde resins. These resins include true thermosetting phenolic resins of the resole type and phenolic novolac resins that may be rendered heat reactive by the addition of catalyst and formaldehyde. Such resins with softening points of 185° F. to 290° F. are acceptable.

The inner and outer coatings can be formed starting with the same or different type of resins. For example, the inner coating could be produced from a novolac and the outer coat from a resole. Regardless of the type of resin used, the outer resin must be curable at conditions that leave the inner coating curable, i.e., fusible and heat reactive.

A coupling agent as subsequently described is preferably incorporated during manufacture into the resin that is to be used as the inner coating, and may optionally also be incorporated into the resin that is to be used as the outer coating. The coupling agent which has a functional group reactive in the resin system is added in an amount ranging from about 0.1 to 10% by weight of the resin. The preferred range is from about 0.1 to 3% by weight of the resin. When using the preferred phenol formaldehyde resins, the coupling agent is incorporated into the resin under the normal reaction conditions used for the formation of the phenol-formaldehyde resin. The coupling agent is added to the resin after the phenol formaldehyde condensation reaction has occurred and the resin has been dehydrated to the final free phenol and melt viscosity range.

A preferred resin of the inner coating is a phenolic novolac resin. Particularly suitable are phenolic novolac resins manufactured by Georgia Pacific, known as 99NO7, and by OxyChem, known as 33-497. Plenco 12727 resin has a softening point range of 85° C. to 100° C. The OxyChem 33-497 exhibits a softening point range of 70° C. to 87° C. Resins suitable for use with the present invention have a softening range from about 60° C. to about 120° C., and more preferably from about 70° C. to about 100° C. When either resin is used, it is necessary to add to the mixture a cross-linking agent to effect the subsequent curing of the resin. Hexamethylenetetramine is the preferred material for this function as it serves as both a catalyst and a source of formaldehyde.

Regarding crosslinking agents and other additives suitable for use with the present invention, numerous of the known crosslinking agents used in the art can be used with the present disclosure. Generally, phenolic novolacs do not harden upon heating, but remain soluble and fusible unless a hardener (e.g., a cross-linking agent) is used in order to convert the resin into an insoluble, infusible layer. Optionally, and equally as acceptable for use within the present invention, phenolic novolac resin coatings can be used in the absence of a crosslinking agent.

Crosslinking agents suitable for use with the present invention include but are not limited to hexamethylenetetramine (HEXA) in aqueous solutions from about 10 wt. % to about 80 wt. %, paraformaldehyde, oxazolidines, oxazolidinones, melamine reins, aldehyde donors, and/or phenol-aldehyde resole polymers, as well as combinations or mixtures thereof.

The coupling agent to be employed is chosen based on the resin to be used. For phenolic resins, the coupling agents include amino, epoxy, and ureido organo silanes. Epoxy modified gamma-glycidoxypropyltrimethoxysilane has given excellent results when used in the amount of 0.50-1.00% based on the weight of the resin. The use of coupling agents as incorporated into the resin and as applied directly to the particulate substrate is discussed in Graham et al, U.S. Pat. No. 4,518,039, incorporated herein by reference in its entirety.

Catalysts can be used in the production of modified phenolic resole or novolac resins, including but not limited to metal ions, salts thereof, and combinations thereof. For example, catalysts containing manganese, zinc, cadmium, magnesium, cobalt, nickle, titanium, iron, lead, calcium, and barium are preferred metal ion catalysts suitable for use with the present invention, with titanium and zinc being even more preferred. Also preferred for use with the present invention are resole- and cresol-based catalysts, including but not limited to bismethylol cresol and resole/modified resole derivatives Finally, numerous additives can be included into the resin or polymer coated particulate substrate of the present disclosure for a variety of special purposes. The resin or polymer coating can include one or more of the following additives, including lubricants, silicone lubricants, wetting agents, non-wetting agents, surfactants (including anionic surfactants, cationic surfactants, non-ionic surfactants, zwitterionic surfactants, halogenated surfactants, and combinations thereof), compounds to promote the adhesion of the resin or polymer coating to the outer surface of the particulate substrate, dyes, flow-modifiers including flow-control agents, flow enhancers, anti-static agents, humidity resistant additives, and biocides such as fungicides, and combinations of such additives. Such additives are typically added in amounts suitable to effect their desired purpose.

The outer coating of resin is formed from a heat curable resin coating formed over the inner resin. As stated previously, this outer resin must be curable at conditions that do not completely cure the inner coating thus leaving the inner coating curable. The preferred resins for the outer coating are of the resole type. Particularly suitable is a fast curing resole resin manufactured by Plenco known as 12727. Resole resins generally are provided dissolved in a methanol and water solution, c.f., Georgia Pacific 102N68. The resin exhibits an extremely fast cure having a 150° C. hot plate cure time of 30 seconds or less. The preferred resole should be in a solution of water and methanol as the solvent system. The organic solids level should be 65-75%, with a water content in the 5-15% level. The hot plate cure time at 150° C. should be in the range of 25-40 seconds.

An additional soluble polymer or resin coating, such as a water-soluble polymer coating, can be added so as to cover the soluble fibers or fibrous material that extrude from the proppant particle. Such an additional soluble polymer or soluble resin coating allows the fiber to be protected during storage and handling, and further protects the soluble fibers to be protected from exposure during the hydraulic fracturing pumping operation.

The inner and outer resin coatings may be formed by a variety of methods. For example, the solvent coating process described in U.S. Pat. No. 3,929,191, to Graham et al., incorporated herein by reference in its entirety. The outer, soluble polymer (e.g., water-soluble polymer) or soluble resin coating can be applied in a similar manner.

Other processes such as that described in U.S. Pat. No. 3,492,147 to Young et al. describes the coating of a particulate substrate with a liquid, uncatalyzed resin composition characterized by its ability to extract a catalyst or curing agent from a non-aqueous solution. As stated above, the preferred resins for use with the instant invention are phenol-formaldehyde novolac resins. When using such resins the preferred coating method is a hot melt coating procedure for forming the inner coat. Such a procedure is described in U.S. Pat. No. 4,585,064, to Graham et al, incorporated herein by reference as if fully written out below. Solvents are preferably used to apply the outer coat. The following is a discussion of typical coating process parameters using the preferred phenol-formaldehyde novolac resins.

D. Method of Making Proppant

The improved high strength, permeability enhancing particles of this embodiment of the invention are coated in a multi-step process. Resins, polymers, and crosslinking agents are typically prepared in manners known in the art, or are available commercially. Precured or curable particulate materials can be prepared by coating a particulate substrate, e.g., frac sand, with a resin or polymeric coating and soluble fibers. Choice of a precured or curable resin coating depends upon a number of parameters, including desired characteristics of the final, proppant product.

In the first step, the resin or polymer is coated onto the outer surface of the particulate substrate material. Such a coating step can be accomplished by admixing the particulate substrate material with the resin or polymer. The soluble fiberous material can then be admixed into the mixer. In an alternative yet equally acceptable method, the soluble fibrous material and the resin or polymer are first admixed, and are then admixed to a particulate substrate material. As yet another alternative, the particulate substrate material can be admixed with the soluble fibrous materials and a resin or polymer. A further acceptable method includes admixing the particulate substrate material with the resin or polymer, and then admixing the coated particulate material with an admixture of resin or polymer and soluble fibrous material.

In the most preferred embodiment, the resin or polymer is coated onto a particulate substrate material, using a hot coat process, followed by adding the soluble fibrous materials, and optionally a crosslinking agent, as well as further resin/polymer coats and soluble fibers. The hot coat process includes heating the particulate substrate, e.g., frac sand, to a desired temperature (e.g., about 400° F. to about 450° F.), and then adding the resin or polymer to the hot particulate substrate. The desired temperature is preferably a temperature above the melting point of the resin or polymer.

Following addition of the resin or polymer to the hot particulate substrate, the resin or polymer is allowed to melt and coat the particulate material over a period of time, followed by the addition of the soluble fibrous materials. A crosslinking agent, e.g., HEXA solution, is typically added, followed by any other desired ingredients, and the mixture stirred together for the desired time so as to produce a particulate material coated with a precured or curable resin product having soluble fibers entrained therein. Additional layers of resin or polymer, soluble fibers, and crosslinking agents can be added as desired. Mixing can occur in the presence or absence of a coupling agent, solvent/carrier fluid, etc. Following completion of the coating steps, the coated particulate material is allowed to dry so as to result in a free-flowing particulate material.

FIG. 1 shows a proppant particle 10, in accordance with one embodiment of the present invention, comprising a substrate particle 20, first resin or polymer coating 30 on the outer edge of the substrate particle, and the "soluble fiber layer" 40. The particle 20, soluble fibers 35, resin or polymer, and any crosslinking agents (not shown) are typically mixed in accordance with the methods described previously, so as to produce proppant particle 10. The proppant 10 is prepared to comprise from about 8 to about 12 weight percent soluble fibers based on resin weight, and the resin content is from about 1 weight percent to about 5 weight percent coating based on substrate weight, as disclosed above. As can be seen in FIG. 1, the soluble fibers 35 are embedded in, and extend beyond, the resin coat 30. They are also shown to be enclosed by the water-soluble outer coat 50. As such, the soluble fibers 35, upon dissolution of the outer, soluble coat 50 under downhole, subterranean conditions, have the ability to provide micro-pathways across and through the substrate particle layer 40 to enhance both fluid flow and conductivity.

Figure 2:
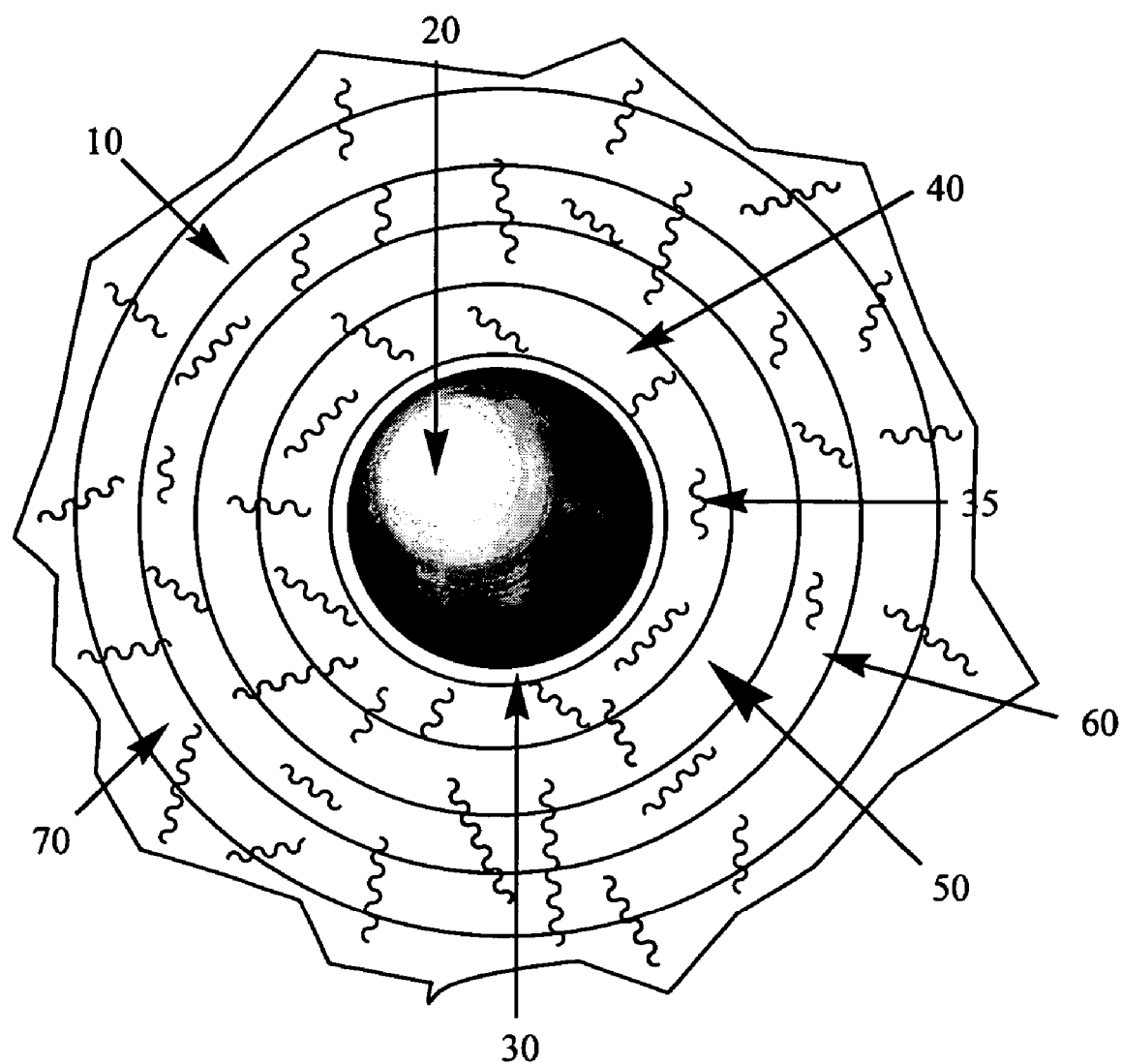
FIG. 2 shows a schematic drawing of a second embodiment of the present invention for use as a proppant.

An alternative yet equally acceptable embodiment of the present invention is shown in FIG. 2. As shown therein, proppant particle 10 is comprised of a substrate particle 20, a first resin coat 30, a soluble fiber layer 40 containing soluble fibers 35, a second resin coat 50, a second soluble fiber layer 60 containing soluble fibers 35, and a final water soluble resin or polymer coat 70. The final resin coat can be curable or noncurable, or it can be soluble (e.g., water soluble), depending upon the desired purpose of the coated particulate proppant. As can be readily envisioned from FIG. 2, the proppant of the present invention can have numerous polymeric or resin coatings with soluble fibrous materials embedded partially or entirely within any number of these coating layers. Most of the soluble fibers will be covered or coated, but the surface will appear to be rough, since the numerous soluble fibers are protruding out at various angles and directions. The soluble fibers or fibrous materials are typically so numerous that they overlap and provide for a series of microchannels to form as the dissolution of the fibers/fibrous material progresses in the subterranean formation.

As can be appreciated, it is useful in preparing the coated proppant of the present embodiment of the invention to precisely control the heat and mass balance to ensure that a cured outer coating encapsulates a still curable inner resin coating. One skilled in the art will recognize that batch size, equipment used, and resins selected will affect process conditions. Initial process temperature, process intervals, amounts of quench water added and amounts of solvent are all interrelated and may be manipulated to arrive at an optimal process. Although experimentation may be required, optimization is within the level of skill in the art.

The soluble fibrous materials incorporated into the resin or polymer-coated particulate substrate of the present invention provide the advantages of improved settling rates. The soluble fibrous materials swell and become "sticky" when exposed to fluids, especially the downhole fracturing fluids. As they swell, they tend to adhere to the wall of the fractured formation. Additionally, due to the numerous fibrous materials extending out from the proppant particle itself, they tend to tangle with the fibers of other particles that are adjacent to them. All of these interactions, as well as the slow dissolution of the fibrous materials/fibers themselves, serve to slow the settling rates of the proppant particulate material. This slowed settling serves to keep the denser proppants from going below the so-called "producing zone" in the formation. Equally, this slowed settling can serve to prevent light or low-density proppants from rising above the "producing zone" of the formation. More specifically, the improved settling rates result from the soluble fibers protruding from one or more of the resin layers coating the particulate substrate, causing a higher drag force/drag coefficient and slowing the rate of settling. Finally, it is envisioned that such soluble fiber containing proppant materials improve flow-back of hydrocarbon product (e.g., improved permeability) due to the conductive channels formed when the soluble fibers dissolve in the subterranean formation.

In yet another preferred embodiment, the proppant material is first coated with a substantially cured inner resin coating, and then is coated with a soluble fibrous material and an outer resin coating, and/or a water soluble polymeric or resin caoting. The final outer coating is on the outer surface of the soluble firbrous material, and can be heat curable, fully cured, water soluble, soluble, or of intermediate nature. A reinforcing agent can be interspersed at the inner resin coating/outer resin coating boundary. Suitable resins include those described above.

A key to the increased strength of the resin coated particles of this embodiment is the addition of a reinforcing agent in the boundary region between the inner and outer resin coatings. The reinforcing agents are preferably added after first coating the particle with a soluble fibrous material (or materials), and then coating the inner resin coating but before the inner coating is cured.

Suitable reinforcing agents include materials known to act as reinforcing agents in typical engineering resins and composite materials. Common to all suitable reinforcing agents is the requirement that they be of a particle size calculated to give the required properties. For example, various mineral fillers including fumed silicas, silica flour, talc, clays, mica, asbestos, calcium carbonate, calcium sulfate, metals and wollastanite are suitable. The size of such reinforcing agents is typically less than 300 mesh. Reinforcing materials of a fibrous or rod like nature should be less than about 0.006 inches and preferably about 0.002 inches in length. Of these, silica flour ground to about 325 mesh is preferred.

Another type of reinforcing agent with utility in the present invention are impact modifiers used in engineering resins and composite materials. Examples of such materials include polyisobutylene, ethylene-vinyl acetate copolymers, ethylene-propylene copolymers and other rubbery materials. Also suitable are the so-called core shell impact modifiers having a rubbery core with a graft polymerized crystalline shell. To obtain the proper particle size cryogenic grinding of the rubbery materials is useful.

E. Methods of Use

In accordance with the method of the present invention, the coated, free flowing proppant particles produced as described above can be used as proppants, proppant spacers such as described in U.S. Pat. No. 6,328,105, gravel or fluid loss agents in hydraulic fracturing, frac packing and gravel packs. The application will determine the choice of whether the proppant pellet is resin coated or not, and whether the coatings are cured or curable. For example, a curable coating may be indicated for gravel packing, while in fracturing a substantially cured outer coating may be preferred to prevent interaction with the frac fluid.

In carrying out a hydraulic fracturing operation, a fracture is first generated by injecting a viscous fluid into the formation at a sufficient rate and pressure to cause the formation to fail in tension. The fracturing fluid may be an oil base, water base, acid, emulsion, foam or other fluid. The fracturing fluid may contain several additives such as viscosity builders, drag reducers, fluid loss additives, corrosion inhibitors, cross linkers and the like, known in the art. Injection of the fluid is typically continued until a fracture of the desired geometry and length is obtained. Preferably, the diameter of the fracture at the well bore is at least 2.5 times the diameter of the largest proppant pellet. A carrier fluid having the proppant suspended therein is then pumped into the fracture. If the particles are resin coated with a curable resin, the temperature of the carrier fluid during pumping operations will be low so as to prevent premature curing of the outer resin coat. The carrier fluid bleeds off into the formation and deposits the proppant pellets in the fracture. The process is controlled by fluid loss agents which are small aggregate particles which temporarily slow the fluid loss to the formation. The outer water-soluble polymer coating starts to dissolve once the proppant is added into the mixer/blender with the fracturing fluid. This in turn starts the exposure of the soluble, fibrous materials. Swelling and dissolution of the fibrous materials begins a short time (e.g., within several minutes) later.

After the proppant is placed, the well is shut in with pressure maintained on the formation. As the pressure within the fracture approaches the normal formation pressure, the fracture walls close in on the proppant and apply an overburden stress thereto. Deeper wells exert higher closure stress and require stronger proppants. Some curable resin coated proppants do not develop their full strength until the resin coating has cured in the formation. Multicoating of both curable and cured resins on a particulate substrate prevents catastrophic failure of the proppant. Consequently, the rapid or slow closure of the formation after the hydraulic treatment is not an issue of major concern, nor in changing the permeability of the resin coated proppant under closure stresses.

When proppant pellets having soluble fibers coating the particulate substrate, an inner curable coating and an outer substantially cured coating are used, it is believed that the closure stress ruptures the outer coating exposing the curable inner coating. At the same time, ambient formation temperature heats the inner resin coating. Initially, the resin fuses and unites at contact areas between contiguous particles or with the formation walls. As the temperature increases the polymerization reaction proceeds until the resin is cured into an insoluble and infusible crosslinked state. Grain to grain links are formed in pendular regions between adjacent particles and bond the packed particles into a permeable mass having considerable compressive strength.

Once the outer, resin coating has been broken down by formation pressures and temperatures, additional soluble fibers become exposed, allowing the particles to be mechanically "locked" together which reduces flow-back of the proppant. Similarly, following dissolution downhole as described above, the soluble fibers have the ability to generate and provide a "micro-pathway" for the hydrocarbons. Such added porosity and permeability characteristics of the particulate proppant resulting from the use of such soluble fibers could lead to increased conductivity of the proppant.

While compositions and methods are described in terms of "comprising" various components or steps (interpreted as meaning "including, but not limited to"), the compositions and methods can also "consist essentially of" or "consist of" the various components and steps, such terminology should be interpreted as defining essentially closed-member groups.

The following examples are included to demonstrate preferred embodiments of the invention. It should be appreciated by those of skill in the art that the techniques disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the scope of the invention.

EXAMPLES

Example 1

Preparation of Resin Coated Particulate Having Soluble Fibers

The coating process was as follows for the inventive product, at the laboratory scale:

1) 30 lbs of the processed particulate substrate (sand, ceramic, bauxite, etc.) was charged to a rotary drum heater and heated to a temperature of 400° F. (204° C.) to 450° F. (232° C.).
2) The heated ceramic was charged to a 1500 lb capacity Barber Green batch muller (mixer).
3) 182 grams of phenolic Novolak resin was added to the mixer containing the particulate substrate (sand), and the resin allowed to melt, coat, and mull for 40 seconds.
4) 18 grams of soluble fibrous material (Polyox, WSR80 from Dow Chemical Co., Freeport, Tex.) was then added to the mixer and allowed to mull for approximately 10 seconds.
5) At this point, 63.7 grams of a 40% (wt) aqueous hexamethylenetetramine solution was added.
6) Immediately thereafter, 182 grams of phenolic novolak resin was added.
7) A further 18 grams of soluble fibers (Polyox, WSR80 from Dow Chemical Co., Freeport, Tex.) was added and the mixture allowed to mull for a further 5 seconds.
8) At this point a further 182 rams of phenoloic novolak resin was added and allowed to mix for 20 seconds prior to the addition of 63.7 grams of a 40% aqueous solution of hexamethylenetetramine, and the mixture allowed to mull for further 15 seconds
9) A further 18 grams of the same soluble fibers as used above was added and allowed to mix for 5 seconds prior to the addition of 63.7 grams of a 40% aqueous solution hexamethylenetetramine which was allowed to mix for further 10 seconds or until the entire tumbling mass was dry and the grains free-flowing
10) A 1% water-soluble polymer coat (125 grams, GMBond, available from Hormel Foods, PA) was then added and allowed to entirely coat the particulate substrate.
11) The coated particulate substrate was discharged to a cold surface (e.g., a fluidized bed cooler) so as to retain its curability before analysis and/or passing on to a storage silo. A graphical representation of such a coated proppant is shown in FIG. 2.

Example 2

Settling Rate Tests

Settling tests were performed according to industry standards. In a typical procedure, a 500-mL graduated cylinder was filled with a 2% aqueous KCl solution, up to the 500-mL graduation mark. The height of the solution column was then recorded. A single particle of each of the products (conventional resin-coated proppant, or the resin-coated proppant in accordance with the present invention) was then dropped into the solution, and the settling time was recorded. Tests were repeated 6 times for each sample, and were carried out at both room temperature (~25° C.) and at 150° F. (65.6° C.). These results are shown in Tables 1 and 2 be

TABLE 1

Settling Rate test results at room temperature (25° C.).

| Test Run | Conventional RCP[1] Rate (ft/min) | Experimental RCP Rate (ft/min) |
|---|---|---|
| 1 | 32.65 | 25.26 |
| 2 | 33.56 | 22.43 |
| 3 | 29.63 | 26.22 |
| 4 | 33.56 | 24.61 |
| 5 | 30.37 | 25.82 |
| 6 | 35.82 | 26.91 |

[1]RCP = "Resin-coated proppant"

TABLE 2

Settling Rate test results at 150° F. (65.6° C.).

| Test Run | Conventional RCP Rate (ft/min) | Experimental RCP Rate (ft/min) |
|---|---|---|
| 1 | 42.85 | 27.42 |
| 2 | 41.37 | 27.90 |
| 3 | 44.03 | 27.44 |
| 4 | 47.52 | 27.27 |
| 5 | 48.01 | 24.61 |
| 6 | 44.85 | 26.96 |

Example 3

Flowback Rate Tests

Flowback rate tests were performed according to industry standards. In a typical procedure, forty-gram samples of a particular particle size of the material prepared in Example 1 were isoated and used in a test cell. Comparisons were made between the proppant of the present invention, containing soluble fibers (EXP), and both procured resin coated proppants and curable resin coated proppants. The results are shown in Tables 3 and 4 below.

TABLE 3

Flowback test results of a pre-cured resin coated product (TLC) vs. soluble fiber resin coated proppant of the invention (TLC EXP).

| 20/40 TLC Flowback cum. (grams) | 20/40 TLC EXP Flowback cum. (grams) | Stress (psi)[1] | Stress cycle |
|---|---|---|---|
| 0 | 0 | 3000 | 1 |
|  |  | 1000 | 1.5 |
| 1 | 0 | 3000 | 2 |
|  |  | 1000 | 2.5 |
| 2 | 0 | 3000 | 3 |
|  |  | 1000 | 3.5 |
| 2.5 | 0.8 | 3000 | 4 |
|  |  | 1000 | 4.5 |
| 0 | 0 | 3000 | 5 |
|  |  | 1000 | 5.5 |
| 2.8 | 1 | 3000 | 6 |
|  |  | 1000 | 6.5 |
| 10 | 2.1 | 3000 | 7 |
|  |  | 1000 | 7.5 |
| 12 | 3.4 | 3000 | 8 |
|  |  | 1000 | 8.5 |
| 15 | 3.8 | 3000 | 9 |
|  |  | 1000 | 9.5 |
| 20 | 4 | 3000 | 10 |

[1]Stress is given in 1,000 to 3,000 psi cycles.

TABLE 4

Flowback test results of a curable resin coated product (SLC) vs. soluble fiber resin coated proppant of the invention (SLC EXP).

| 20/40 SLC Flowback cum. (grams) | 20/40 SLC EXP Flowback cum. (grams) | Stress (psi)[1] | Stress cycle |
|---|---|---|---|
| 0 | 0 | 3000 | 1 |
|   |   | 1000 | 1.5 |
| 0 | 0 | 3000 | 2 |
|   |   | 1000 | 2.5 |
| 0 | 0 | 3000 | 3 |
|   |   | 1000 | 3.5 |
| 1 | 0 | 3000 | 4 |
|   |   | 1000 | 4.5 |
| 0 | 0 | 3000 | 5 |
|   |   | 1000 | 5.5 |
| 1.5 | 0.6 | 3000 | 6 |
|   |   | 1000 | 6.5 |
| 2.6 | 0.8 | 3000 | 7 |
|   |   | 1000 | 7.5 |
| 3.1 | 1 | 3000 | 8 |
|   |   | 1000 | 8.5 |
| 4.8 | 1.1 | 3000 | 9 |
|   |   | 1000 | 9.5 |
| 5.6 | 1.4 | 3000 | 10 |

[1]Stress is given in 1,000 to 3,000 psi cycles.

As is readily apparent from the data given in Tables 3 and 4 above, the particulate substrates of the present invention having a soluble fibrous material embedded in and throughout their coating exhibit significantly improved flowback control when compared to both procured and curable resin-coated proppants. From Table 3, it can be seen that at the end of 10 stress cycles, approximately five times as much proppant flowback was observed with the precured resin coated proppant in comparison to that observed with the soluble fiber containing proppant of the present invention. Similarly, as shown in Table 4, approximately three times as much proppant flowback was observed with a curable resin coated proppant in comparison to that observed with the soluble fiber containing proppant of the present invention. Consequently, these results suggest that the soluble-fiber/fibrous material containing proppant of the present invention exhibits significantly improved flowback control properties under simulated downhole conditions.

All of the compositions and/or methods and/or processes disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and/or processes and in the steps or in the sequence of steps of the methods described herein without departing from the concept and scope of the invention. More specifically, it will be apparent that certain agents which are chemically related can be substituted for the agents described herein while the same or similar results would be achieved. All such similar substitutes and modifications apparent to those skilled in the art are deemed to be within the scope and concept of the invention.

What is claimed is:

1. A proppant particle comprising:
    a particulate substrate having an outer surface;
    a coating comprising resin or polymer; and
    a soluble, fibrous material;
        wherein the coating substantially covers the outer surface of the particulate substrate,
        wherein the soluble fibrous material is embedded in the coating on the outer surface of the particulate substrate, and
        wherein the soluble fibrous material is soluble in a subterranean environment.

2. The proppant particle of claim 1, further comprising a soluble resin or polymer coating that substantially encapsulates the particulate substrate.

3. The proppant particle of claim 1, further comprising a water soluble polymer coating that substantially encapsulates the particulate substrate.

4. The proppant particle of claim 1, wherein the particulate substrate is selected from the group consisting of natural materials, silica proppants, ceramic proppants, metallic proppants, synthetic organic proppants, and mixtures thereof.

5. The proppant particle of claim 1, wherein the particulate substrate has a particle size in the range from about 4 mesh to about 200 mesh.

6. The proppant particle of claim 1, wherein the soluble, fibrous material is selected from the group consisting of polyethylene oxides, polypropylene oxides, polymeric lactones, water-soluble acrylic fibers, latex fibers, polyester fibers, polyactide fibers, collagen fibers, natural fibers, synthetic fibers, and mixtures thereof.

7. The proppant particle of claim 1, wherein the soluble, fibrous material has a softening point of from about 70° C. to about 100° C.

8. The proppant particle of claim 1, wherein the soluble fibrous material has a length to diameter ratio of at least about 2:1.

9. The proppant particle of claim 1, wherein the soluble fibrous material includes soluble particles having a length to diameter ratio of less than about 2.

10. The proppant particle of claim 1, wherein the resin coating comprises novolac polymers, resole polymers, and mixtures thereof.

11. The proppant particle of claim 1, wherein the resin coating comprises a member of the group consisting of a furan resin, a phenolic-furan resin, and mixtures thereof.

12. The proppant particle of claim 1, wherein the resin comprises a curable resin.

13. The proppant particle of claim 1, wherein the soluble fibrous material is dispersed within the resin.

14. The proppant particle of claim 1, wherein the soluble fibrous material is embedded in the resin.

15. The proppant particle of claim 1, further comprising at least one additional resin or polymer coating surrounding the soluble fibrous material embedded in the resin coat.

16. A method of making a proppant particle of claim 1 comprising the steps of:
    a) providing a particulate substrate material;
    b) contacting the particulate substrate material with a resin or polymer to coat the particulate substrate with a coating of resin or polymer;
    c) providing a soluble fibrous material; and
    d) combining the particulate substrate material of step (b) with the soluble fibrous material such that the soluble fibrous material is at least partially embedded in the resin or polymer coat, wherein the soluble fibrous material is soluble in a subterranean environment.

17. The proppant particle prepared according to the method of claim 16.

18. A method of making a proppant particle of claim 1, the method comprising the steps of:
provuiding a particulate substrate, a resin or polymer, and a soluble fibrous material, wherein the soluble fibrous material is soluble in a subterranean environment;
combining the particulate substrate, the resin or polymer, and the soluble fibrous material in a manner wherein the resin or polymer coats the particulate substrate with a coating of resin or polymer and soluble fibrous material; and
solidifying the mixture.

19. The method of claim 18, wherein the resin or polymer is coated onto the particulate substrate and then the soluble fibrous material is added to the resin or polymer coated particulate substrate.

20. The method of claim 18, further comprising heating the resin or polymer to a temperature sufficient to melt the resin or polymer, forming a mixture and coating the particulate substrate, adding a soluble fibrous material to the resin or polymer coated particulate substrate, and then
adding a crosslinking agent to the mixture.

21. A proppant particle comprising:
a particulate substrate having an outer surface;
a first coating comprising resin or polymer;
a soluble, fibrous material; and
a soluble polymer outer coating,
wherein the first coating substantially covers the outer surface of the particulate substrate,
the soluble fibrous material is embedded in the coating on the outer surface of the particulate substrate,
the soluble fibrous material is soluble in a subterranean environment, and
the soluble polymer outer coating substantially encapsulates the particulate substrate.

* * * * *